US010893409B2

(12) United States Patent
Abtin et al.

(10) Patent No.: US 10,893,409 B2
(45) Date of Patent: Jan. 12, 2021

(54) INDICATION OF EVOLVED PACKET SYSTEM FALLBACK CAPABILITY

(71) Applicant: Telefonaktiebolaget LM Ericsson (publ), Stockholm (SE)

(72) Inventors: Afshin Abtin, Sollentuna (SE); Ralf Keller, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/311,577

(22) PCT Filed: Oct. 12, 2018

(86) PCT No.: PCT/EP2018/077862
§ 371 (c)(1),
(2) Date: Dec. 19, 2018

(87) PCT Pub. No.: WO2020/074093
PCT Pub. Date: Apr. 16, 2020

(65) Prior Publication Data
US 2020/0120485 A1    Apr. 16, 2020

(51) Int. Cl.
*H04W 8/24* (2009.01)
*H04W 36/00* (2009.01)
*H04W 80/10* (2009.01)
*H04W 84/04* (2009.01)
*H04W 88/06* (2009.01)

(52) U.S. Cl.
CPC .......... *H04W 8/24* (2013.01); *H04W 36/0022* (2013.01); *H04W 80/10* (2013.01); *H04W 84/042* (2013.01); *H04W 88/06* (2013.01)

(58) Field of Classification Search
CPC .............. H04W 36/0022; H04W 80/10; H04L 65/1006; H04L 65/1016; H04L 65/1069; H04L 65/1073; H04L 69/24
See application file for complete search history.

(56) References Cited

U.S. PATENT DOCUMENTS

2018/0132141 A1    5/2018  Huang-Fu et al.
2019/0281647 A1*   9/2019  Chiang ............... H04W 36/305
2020/0053133 A1*   2/2020  Atarius ............... H04L 65/1016

OTHER PUBLICATIONS

3GPP, "3rd Generation Partnership Project; Technical Specification Group Core Network and Terminals; IP multimedia call control protocol based on Session Initiation Protocol (SIP) and Session Description Protocol (SDP); Stage 3 (Release 15)", 3GPP TS 24.229 V15.4.0, Sep. 2018, 1-1039.
3GPP, "3rd Generation Partnership Project; Technical Specification Group Services and System Aspects; Procedures for the 5G System; Stage 2 (Release 15)", 3GPP TS 23.502 V15.3.0, Sep. 2018, 1-330.

(Continued)

*Primary Examiner* — Pao Sinkantarakorn
(74) *Attorney, Agent, or Firm* — Murphy, Bilak & Homiller, PLLC

(57) ABSTRACT

There is provided mechanisms for indicating evolved packet system (EPS) fallback capability. A method is performed by a user equipment (UE). The method comprises providing, towards a call session control function (CSCF), call status information with respect to EPS fallback capability of the UE. There is also provided a UE configured to perform such a method.

19 Claims, 8 Drawing Sheets

(56) References Cited

OTHER PUBLICATIONS

3GPP, "3rd Generation Partnership Project; Technical Specification Group Services and System Aspects; System Architecture for the 5G System; Stage 2 (Release 15)", 3GPP TS 23.501 V15.3.0, Sep. 2018, 1-226.

Unknown, Author, "3rd Generation Partnership Project; Technical Specification Group Services and System Aspects; Procedures for the 5G System; Stage 2 (Release 15)", 3GPP TS 23.502 V15.1.0, Mar. 2018, 1-285.

Unknown, Author, "Solution to recover lost SIP messages in case of EPS fallback for IMS voice without N26 interface", 3GPP TSG-CT WG1 Meeting #110, C1-182195, Kunming (P.R. of China), Apr. 16-20, 2018, pp. 1-9.

* cited by examiner

INDICATION OF EVOLVED PACKET SYSTEM FALLBACK CAPABILITY

TECHNICAL FIELD

Embodiments presented herein relate to a method, a user equipment, a computer program, and a computer program product for indicating evolved packet system fallback capability. Further embodiments presented herein relate to a method, a call session control function, a computer program, and a computer program product for obtaining indication of evolved packet system fallback capability. Further embodiments presented herein relate to a method, an application server, a computer program, and a computer program product for obtaining indication of evolved packet system fallback capability.

BACKGROUND

In communications networks, there may be a challenge to obtain good performance and capacity for a given communications protocol, its parameters and the physical environment in which the communications network is deployed.

For example, in order to support various deployment scenarios for obtaining Internet Protocol (IP) Multimedia Subsystem (IMS) voice service, the User Equipment (UE) and New Radio (NR) access network operatively connected to a fifth generation telecommunication (5G) system core network (5GC) may support the mechanism to direct or redirect the UE from NR connected to 5GC either towards the Evolved Universal Mobile Telecommunications System (UMTS) Terrestrial Radio Access (E-UTRA) network operatively connected to the 5GC (so-called Radio Access Technology (RAT) fallback) or towards the Evolved Packet System (EPS) network (so-called E-UTRAN (E-UTRA network) connected to Evolved Packet Core (EPC) System fallback).

In general terms, the following principles apply for the IMS voice service: The serving Access Management Function (AMF) indicates toward the UE during the registration procedure that IMS voice over a packet switched (PS) session is supported. If a request for establishing the Quality of service (QoS) flow for IMS voice reaches the NR access network, the NR access network responds indicating rejection of the establishment request and the NR access network may trigger one of the following procedures depending on UE capabilities, N26 availability, network configuration and radio conditions: Redirection to EPS; Handover procedure to EPS; Redirection to E-UTRA connected to 5GC; or Handover to E-UTRA connected to 5GC.

In order to support various deployment scenarios for obtaining Emergency Services, the UE and 5GC may support the mechanism to direct or redirect the UE either towards E-UTRA connected to 5GC (so-called RAT fallback) when NR does not support Emergency Services or towards EPS (so-called E-UTRAN connected to EPC System fallback) when the 5GC does not support Emergency Services. Emergency Services fallback may be used when the 5G system does not indicate support for Emergency Services and indicates support for Emergency Services fallback.

The following principles apply for Emergency Services Fallback, especially the Service Request model: If the AMF indicates support for Emergency Services fallback in the Registration Accept message, then in order to initiate Emergency Service, normally registered UE supporting Emergency Services fallback shall initiate a Service Request with Service Type set to Emergency Services fallback as defined in 3GPP TS 23.502 version 15.3.0 clause 4.13.4.1.

The AMF uses the Service Type Indication within the Service Request to redirect the UE towards the appropriate RAT or system. The 5G system may, for Emergency Services, trigger one of the following procedures: Handover or redirection to EPS; Handover or redirection to E-UTRA connected to 5GC network. After receiving the Service Request for Emergency Fallback, the AMF triggers an N2 procedure resulting in either CONNECTED state mobility (Handover procedure) or IDLE state mobility (redirection) to either E-UTRA/5GC or to E-UTRAN/EPC depending on factors such as N26 availability, network configuration and radio conditions. In the N2 procedure, the AMF based on support for Emergency Services in 5GC or EPC may indicate the target core network (CN) for the radio access network (RAN) node to know whether inter-RAT fallback or inter-system fallback is to be performed. The target CN indicated in the N2 procedure is also conveyed to the UE in order to be able to perform the appropriate Non-Access Stratum (NAS) procedures (in so-called S1 or N1 Mode).

In terms of EPS fallback for IMS voice, when the UE is served by the 5G system, the UE has one or more ongoing Protocol Data Unit (PDU) sessions, each including one or more QoS Flows. The serving public land mobile network (PLMN) AMF has sent an indication towards the UE during the Registration procedure that IMS voice over PS session is supported, see clause 5.16.3.9 in 3GPP TS 23.501 version 15.3.0, and the UE has registered in the IMS. If N26 is not supported, the serving PLMN AMF sends an indication towards the UE during the Registration procedure that interworking without N26 is supported, see clause 5.17.2.3.1 in 3GPP TS 23.501 version 15.3.0. FIG. 4.13.6.1-1 in 3GPP TS 23.502 version 15.3.0 describes an EPS fallback procedure for IMS voice.

In terms of RAT fallback in 5GC for IMS voice, when the UE is served by the 5GC, the UE has one or more ongoing PDU Sessions each including one or more QoS Flows. The serving PLMN AMF has sent an indication towards the UE during the Registration procedure that IMS voice over PS session is supported, see clause 5.16.3.10 in 3GPP TS 23.501 version 15.3.0, and the UE has registered in the IMS. FIG. 4.13.6.2-1 in 3GPP TS 23.502 version 15.3.0 describes a RAT fallback procedure in 5GC for IMS voice.

In view of the above, the UE performs IMS Registration over 5GS into the IMS. In this respect, also the first Session Initiation Protocol (SIP) signals for mobile originating calls (MO; i.e., calls originating at the UE) and mobile terminating calls (MT; .e, calls terminating at the UE) are carried via the 5G system before the EPS Fallback procedure is triggered. When the UE is camping on a Next Generation Radio Access Network (NG-RAN), the so-called P-Access-Network-Info (PANI) header is populated by the UE in various SIP request and response messages. This is according to section 7.2.4A in 3GPP TS 24.229 version 15.4.0.

Hence the IMS has received the location of the UE in the PANI header indicating that the UE is on NG-RAN/NR while during EPS Fallback the UE changes from NG-RAN/NR to E-UTRAN connected to EPC (or in case of RAT Fallback to NG-RAN/LTE, where LTE is short for Long Term Evolution). The UE may provide updated location information in subsequent SIP messages, but the IMS may have made decisions based on the assumption that the UE is on NG-RAN/NR e.g. retrieved network provided location information while UE still camped on NG-RAN/NR and the IMS may need to have different timer values to cater for the additional delay during call setup. EPS Fallback is here used to exemplify but the issue is equally applicable for RAT Fallback.

Hence, there is still a need for an improved handling of EPS fallback for a UE.

SUMMARY

An object of embodiments herein is to enable efficient handling of EPS fallback for a UE such that the above issues can be avoided or resolved, or at least such that the above issues can be mitigated or reduced.

According to a first aspect there is presented a method for indicating evolved packet system (EPS) fallback capability. The method is performed by a user equipment (UE). The method comprises providing, towards a call session control function (CSCF), call status information with respect to EPS fallback capability of the UE.

According to a second aspect there is presented a UE for indicating EPS fallback capability. The UE comprises processing circuitry. The processing circuitry is configured to cause the UE to provide, towards a CSCF, call status information with respect to EPS fallback capability of the UE.

According to a third aspect there is presented a UE for indicating EPS fallback capability. The UE comprises a provide module configured to provide, towards a CSCF, call status information with respect to EPS fallback capability of the UE.

According to a fourth aspect there is presented a computer program for indicating EPS fallback capability, the computer program comprising computer program code which, when run on processing circuitry of a UE, causes the UE to perform a method according to the first aspect.

According to a fifth aspect there is presented a method for obtaining indication of EPS fallback capability. The method is performed by a CSCF. The method comprises obtaining, originating from a UE, call status information with respect to EPS fallback capability of the UE.

According to a sixth aspect there is presented a CSCF for obtaining indication of EPS fallback capability. The CSCF comprises processing circuitry. The processing circuitry is configured to cause the CSCF to obtain, originating from a UE, call status information with respect to EPS fallback capability of the UE.

According to a seventh aspect there is presented a CSCF for obtaining indication of EPS fallback capability. The CSCF comprises an obtain module configured to obtain, originating from a UE, call status information with respect to EPS fallback capability of the UE.

According to an eighth aspect there is presented a computer program for obtaining indication of EPS fallback capability, the computer program comprising computer program code which, when run on processing circuitry of a CSCF, causes the CSCF to perform a method according to the fifth aspect.

According to a ninth aspect there is presented a method for obtaining indication of EPS fallback capability. The method is performed by an application server (AS). The method comprises obtaining, from a CSCF and originating from a UE, call status information with respect to EPS fallback capability of the UE.

According to a tenth aspect there is presented an AS for obtaining indication of EPS fallback capability. The AS comprises processing circuitry. The processing circuitry is configured to cause the AS to obtain, from a CSCF and originating from a UE, call status information with respect to EPS fallback capability of the UE.

According to an eleventh aspect there is presented an AS for obtaining indication of EPS fallback capability. The AS comprises an obtain module configured to obtain, from a CSCF and originating from a UE, call status information with respect to EPS fallback capability of the UE.

According to a twelfth aspect there is presented a computer program for obtaining indication of EPS fallback capability, the computer program comprising computer program code which, when run on processing circuitry of an AS, causes the AS to perform a method according to the ninth aspect.

According to a thirteenth aspect there is presented a computer program product comprising a computer program according to at least one of the fourth aspect, the eight aspect, and the twelfth aspect and a computer readable storage medium on which the computer program is stored. The computer readable storage medium can be a non-transitory computer readable storage medium.

Advantageously these methods, these UEs, these CSCFs, these APs, and these computer programs and this computer program product provide efficient mechanisms for a network to obtain information about EPS fallback capability of the UE.

Advantageously these methods, these UEs, these CSCFs, these APs, and these computer programs and this computer program product provide awareness at IMS level of EPS fallback capability of the UE, enabling appropriate adjustments of procedures as performed by the IMS for the UE where information of EPS fallback capability is of use.

Advantageously these methods, these UEs, these CSCFs, these APs, and these computer programs and this computer program product can be used to enable correct location also for calls that are subject of EPS fallback, better timer values, improved KPI accuracy, and extended information in CDRs.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
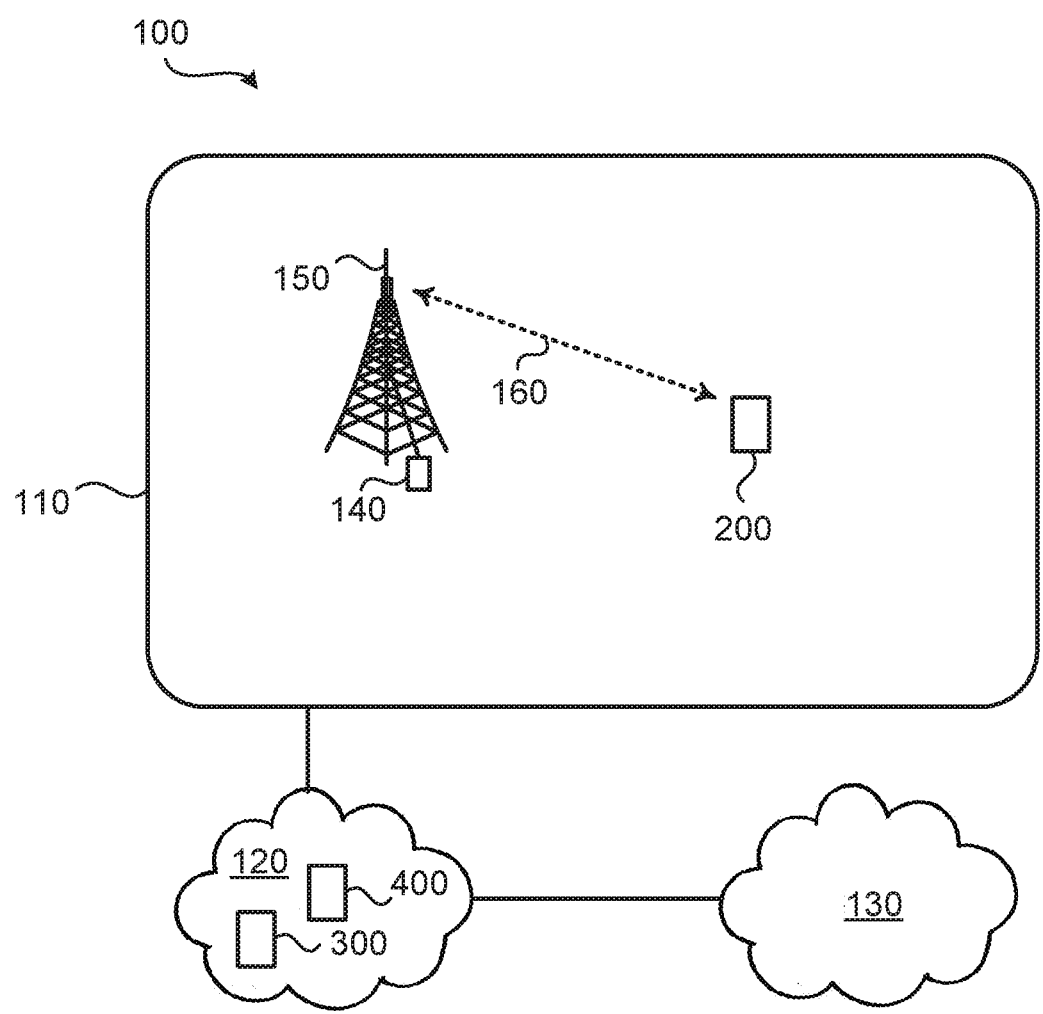
FIG. 1 is a schematic diagram illustrating a communication network according to embodiments.

FIG. 1 is a schematic diagram illustrating a communications network too where embodiments presented herein can be applied. The communications network 100 could be a third generation (3G) telecommunications network, a fourth generation (4G) telecommunications network, or a fifth generation (5G) telecommunications network and support any 3GPP telecommunications standard, where applicable.

The communications network 100 comprises a network node 140 configured to, via a transmission and reception point 150, provide network access to at least one UE 200 in a radio access network 110, thus enabling the UE 200 to communicate over a wireless link 160. The radio access network 110 is operatively connected to a core network 120. As the skilled person understands, the core network 110 comprises nodes, functions, and devices. Of relevance for the herein disclosed embodiments the core network 110 comprises a CSCF 300 and a AS 400. The core network 120 is in turn operatively connected to a service network 130, such as the Internet. The UE 200 is thereby enabled to, via the network node 140, access services of, and exchange data with, the service network 130.

Examples of network nodes 140 are radio access network nodes, radio base stations, base transceiver stations, Node Bs, evolved Node Bs, g Node Bs, access points, and access nodes, and backhaul nodes. Examples of UEs 200 are wireless devices, mobile stations, mobile phones, handsets, wireless local loop phones, smartphones, laptop computers, tablet computers, network equipped sensors, network equipped vehicles, and so-called Internet of Things devices.

The embodiments disclosed herein relate to mechanisms for indicating EPS fallback capability and for obtaining indication of EPS fallback capability. In order to obtain such mechanisms there is provided a UE 200, a method performed by the UE 200, a computer program product comprising code, for example in the form of a computer program, that when run on processing circuitry of the UE 200, causes the UE 200 to perform the method. In order to obtain such mechanisms there is further provided a CSCF 300, a method performed by the CSCF 300, and a computer program product comprising code, for example in the form of a computer program, that when run on processing circuitry of the CSCF 300, causes the CSCF 300 to perform the method. In order to obtain such mechanisms there is further provided an AS 400, a method performed by the AS 400, and a computer program product comprising code, for example in the form of a computer program, that when run on processing circuitry of the AS 400, causes the AS 400 to perform the method.

At least some of the embodiments disclosed herein are based on the UE providing an indication whether it supports EPS Fallback and possible also IMS voice on NG-RAN/NR (LTE, EPC integrated WiFi) during registration in the IMS.

Figure 2:
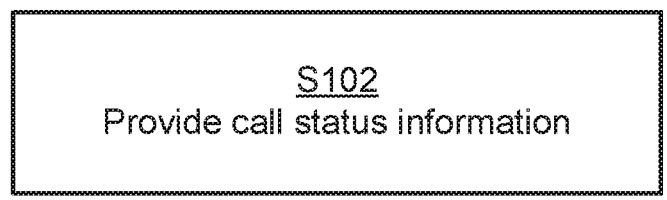
FIGS. 2, 3, and 4 are flowcharts of methods according to embodiments.

Reference is now made to FIG. 2 illustrating a method for indicating EPS fallback capability as performed by the UE 200 according to an embodiment.

The EPS fallback capability is by the UE 200 indicated to the CSCF 300. Particularly, the UE 200 is configured to perform step S102:

S102: The UE 200 provides, towards a CSCF 300, call status information with respect to EPS fallback capability of the UE 200.

Embodiments relating to further details of indicating EPS fallback capability as performed by the UE 200 will now be disclosed.

There could be different alternatives as to when the call status information is to be provided towards the CSCF 300. In some aspects the call status information is provided during IMS registration of the UE 200. Particularly, according to an embodiment the call status information is provided towards the CSCF 300 during registration of the UE 200 with the CSCF 300. For example the call status information might be provided as part of call set-up signalling for the UE 200. In this respect the UE 200 could either act as the mobile originating party or act as the mobile terminating party when the call status information is provided towards the CSCF 300.

There could be different types of messages in which the call status information is conveyed. According to an embodiment the call status information is provided in a session initiation protocol (SIP) message. There are different examples of such SIP messages, for example depending on whether the UE 200 acts as the mobile originating party or acts as the mobile terminating party. Thus, the call status information could be provided in either a SIP request message or a SIP response message. As an example, the SIP message could be a SIP register message. Further in this respect the UE 200 could provide the call status information as part of a feature tag in the SIP message and/or in the so-called Feature-Caps header field of the SIP message.

There could be different types of sources for the call status information. In some aspects the call status information is provided from a modem in the UE 200 or is configured in the UE 200.

Figure 3:
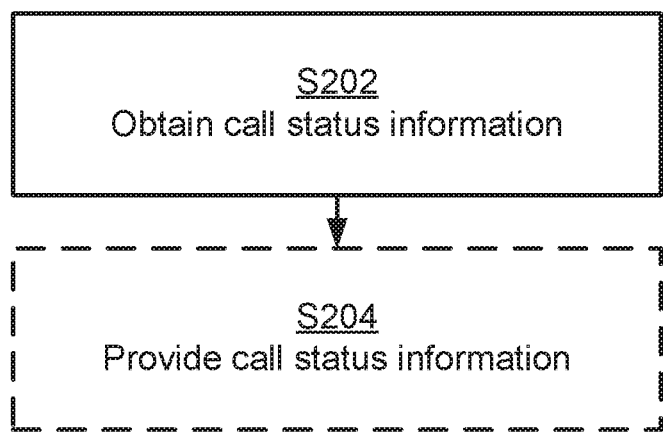

Reference is now made to FIG. 3 illustrating a method for obtaining indication of EPS fallback capability of a UE 200 as performed by the CSCF 300 according to an embodiment.

As disclosed above, the UE 200 in step S102 provides call status information with respect to EPS fallback capability of the UE 200 towards the CSCF 300. It is assumed that the CSCF 300 obtains the call status information. Thus, the CSCF 300 is configured to perform step S202:

S202: The CSCF 300 obtains, from the UE 200, call status information with respect to EPS fallback capability of the UE 200.

Embodiments relating to further details of obtaining indication of EPS fallback capability of a UE 200 as performed by the CSCF 300 will now be disclosed.

There could be different examples of CSCFs 300. In some aspects the CSCF 300 is represented by any of a proxy CSCF (P-CSCF), an interrogating CSCF (I-CSCF), and a serving CSCF (S-CSCF). In some aspects the call status information is by the P-CSCF obtained from the UE 200, from the P-CSCF provided to the I-CSCF, and from the I-CSCF provided to the S-CSCF.

As disclosed above, in some aspects the UE 200 provides the call status information during registration of the UE. Hence, according to an embodiment the call status information is obtained during registration of the UE 200 with the CSCF 300.

As disclosed above, in some aspects the UE 200 provides the call status information as part of call set-up signalling. Hence, according to an embodiment the call status information is obtained as part of call set-up signalling for the UE 200.

In some aspects the call status information is forwarded towards the AS 400. Thus, according to an embodiment the CSCF 300 is configured to perform (optional) step S204:

S204: The CSCF 300 provides the call status information towards the AS 400.

In some aspects the call status information is in step S204 provided from the S-CSCF towards the AS 400.

The CSCF 300 might have different uses of the call status information. Some examples of how the CSCF 300 might use the call status information will be provided next.

The CSCF 300 (particularly when being a P-CSCF or an S-CSCF) might use the call status information to determine whether to adjust timer values. For example, to wait longer to receive network provided location notification and SIP responses.

The CSCF 300 (particularly when being a P-CSCF or an S-CSCF) might use the call status information to identify such UEs 200 and use cases to arm separate performance counters (such as Key Performance Indicators, KPI). For example, keeping separate performance counters to distinguish success rate of call setup and call setup time specific for EPS fallback cases.

The CSCF 300 (particularly when being a P-CSCF or an S-CSCF) might use the call status information to, for call detail records (CDR), store both the location on NR for call establishment and the location on LTE during the call or to store information that the call was subject of EPS Fallback.

The CSCF 300 (particularly when being a P-CSCF) might use the call status information to determine whether to use the Transmission Control Protocol (TCP) or the User Datagram Protocol (UDP) for SIP signalling. In case UDP is used, and EPS Fallback takes place, there is a risk of losing SIP messages; this risk is avoided when using TCP. However, some mobile network operators might to use UDP over TCP and hence TCP might only be used when needed.

Figure 4:
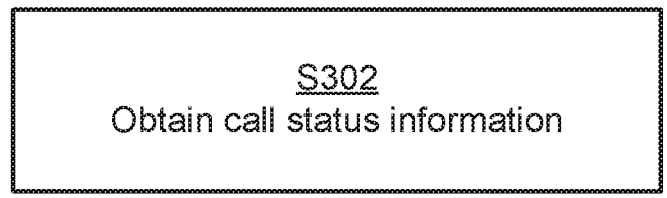

Reference is now made to FIG. 4 illustrating a method for obtaining indication of EPS fallback capability of a UE 200 as performed by the AS 400 according to an embodiment.

As disclosed above, in some aspects the call status information is forwarded from the CSCF 300 towards the AS 400. It is assumed that the AS 400 obtains the call status information. Thus, the AS 400 is configured to perform step S302:

S302: The AS 400 obtains, from the CSCF 300 and originating from the UE 200, call status information with respect to EPS fallback capability of the UE 200.

Embodiments relating to further details of obtaining indication of EPS fallback capability of a UE 200 as performed by the AS 400 will now be disclosed.

As disclosed above, according to an embodiment the call status information is obtained as part of call set-up signalling for the UE 200.

The AS 400 might have different uses of the call status information. Some examples of how the AS 400 might use the call status information will be provided next.

The AS 400 might use the call status information to determine whether and when to perform network-initiated location queries. For example, to trigger location query only after being sure that EPS Fallback was performed, or the call has been established on NG-RAN/NR. For example, timing of performing the query for network provided location retrieval might be adapted if knowing that the call will subject for EPS fallback.

The AS 400 might use the call status information to determine whether to adjust timer values. For example, to wait longer to receive network provided location notification and SIP responses.

The AS 400 might use the call status information to identify such UEs 200 and use cases to arm separate performance counters (such as KPIs). For example, keeping separate performance counters to distinguish success rate of call setup and call setup time specific for EPS fallback cases.

The AS 400 might use the call status information to, for CDRs, store both the location on NR for call establishment and the location on LTE during the call or to store information that the call was subject of EPS Fallback.

Embodiments equally applicable to the methods performed by the UE 200, the CSCF 300, and the AS 400 will now be disclosed.

In some aspects the call status information specifies that the call will be subject of EPS Fallback. In some aspects this specification is only given if the UE is only supporting EPS Fallback. This is also indicated to the RAN. Particularly, according to an embodiment the call status information specifies that the call will be subject to EPS fallback only when the UE 200 supports EPS fallback but not native IMS voice service on NG-RAN/NR.

In some aspects the call status information specifies that the call may be subject of EPS Fallback. Particularly, according to an embodiment the call status information specifies that the UE 200 supports EPS fallback. In some aspects this specification is only given if the UE is supporting EPS Fallback but also native IMS Voice on NG-RAN/NR. This is also indicated to the RAN. Particularly, according to an embodiment the call status information specifies that the UE 200 supports EPS fallback when the UE 200 supports EPS fallback as well as native IMS voice service on NG-RAN/NR.

In some aspects the call status information specifies that the call will not be subject of EPS Fallback. In some aspects this specification is only given if the UE is not supporting EPS Fallback but only native IMS Voice on NG-RAN/NR. This is also indicated to the RAN. Particularly, according to an embodiment the call status information specifies that the call will not be subject to EPS fallback only when the UE 200 does not support EPS fallback but only native IMS voice service on NG-RAN/NR.

In some aspects the call status information specifies whether the UE 200 supports IMS voice on LTE connected to EPC, IMS voice on EPC integrated to WiFi. Particularly, according to an embodiment the call status information specifies whether or not the UE 200 supports any of: IMS voice service on a LTE connected to EPC, or IMS voice on EPC-integrated WiFi.

In some embodiments the call status information is provided as a voice packet core support indication (VPCS).

Figure 5:
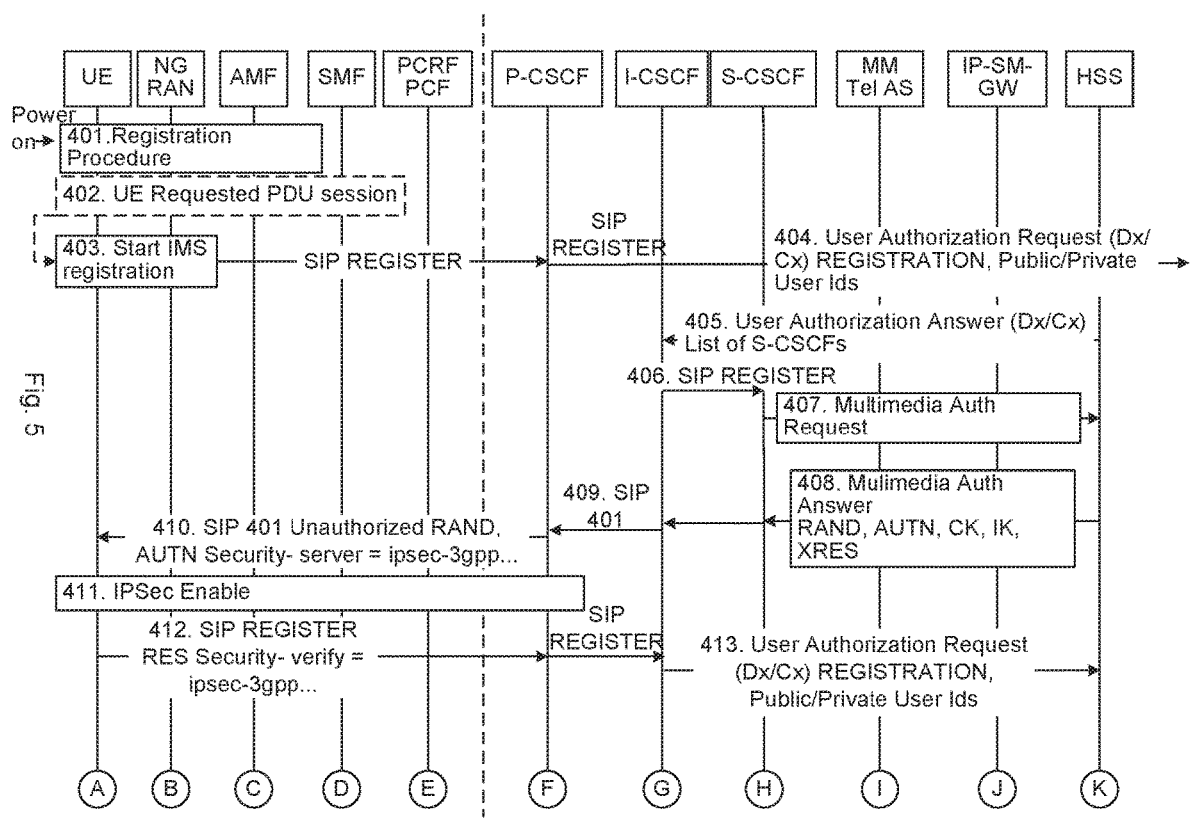
FIG. 5 is a signalling diagram according to an embodiment.
Figure 5:
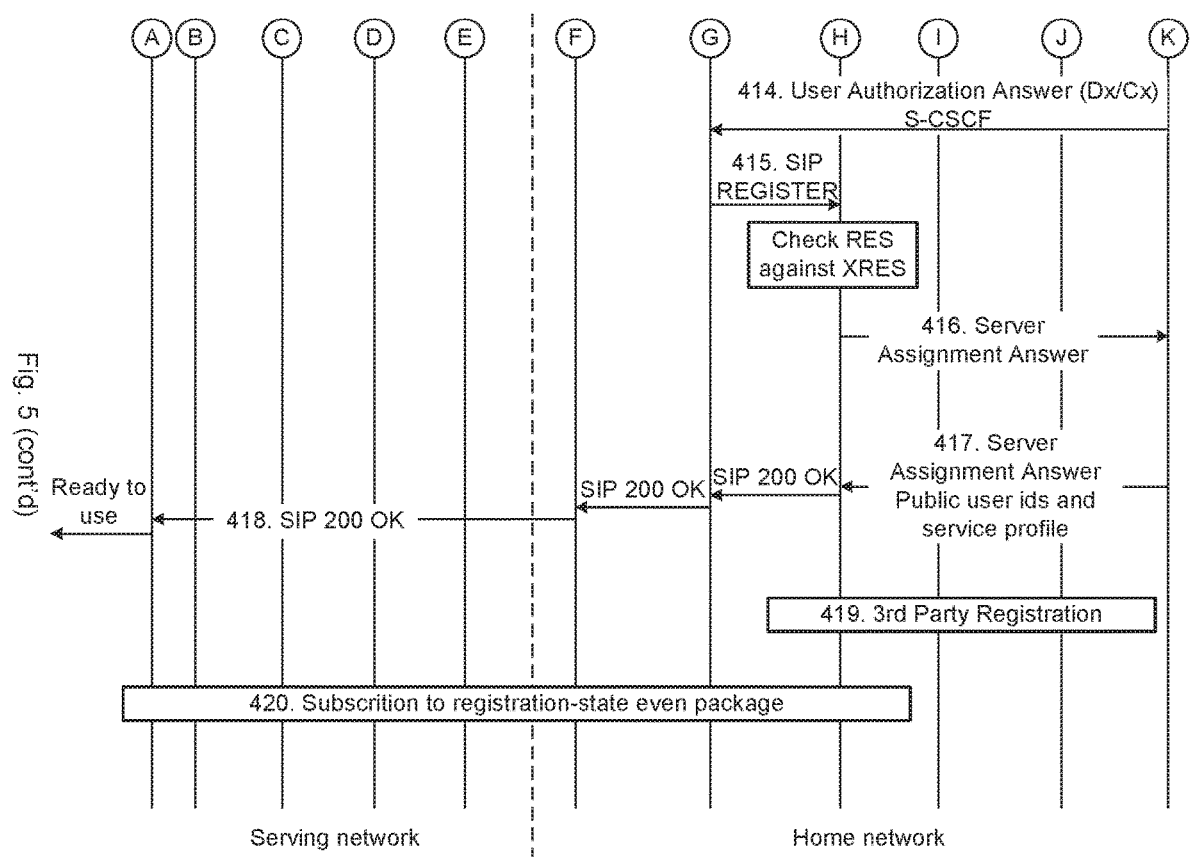

One particular embodiment for indicating EPS fallback capability and for obtaining indication of EPS fallback capability based on at least some of the above disclosed embodiments and given in the context of a SIP register procedure will now be disclosed in detail with reference to the signalling diagram of FIG. 5. In addition to functions, nodes, entities, and devices as presented above, the signalling diagram involves interaction of a Session Management Function (SMF), a Policy and Charging Rules Function (PCRF)/Policy Control Function (PCF), an IP Short-Messaging Gateway (IP-SM-GW), and a Home Subscriber Server (HSS). The AS 400 is represented by an IMS multimedia telephony service application server (MM Tel AS).

S401: The UE 200 registers to the 5GC network.

S402: The UE 200, if receiving the IMS voice over PS support indication in step S401 (or for any other reason), request a new PDU session for the IMS Access Point Name (APN). The P-CSCF addresses are received during this procedure.

S403: When the IMS signaling bearer is available, the UE 200 sends a SIP REGISTER message to the IMS. The SIP REGISTER includes an indication that the UE 200 wants to authenticate using the IMS Authentication and Key Agreement (AKA) protocol. The UE 200 includes the call status information as a VPCS indication. The P-CSCF forwards the request to the I-CSCF.

One way to partly implement step S403 is to perform step S102 and step S202.

S404: the I-CSCF sends a Diameter User Authorization Requests to the HSS to retrieve the identity of the S-CSCFs where the SIP REGISTER request can be forwarded.

S405: The HSS replies with a User Authorization Answer including a list of S-CSCFs.

S406: The I-CSCF selects one of the S-CSCF in the list and forwards the SIP REGISTER to the thus selected S-CSCF.

S407: The S-CSCF receives the SIP REGISTER and contacts the HSS with a Multimedia Authentication Request to retrieve the authentication vectors for the IMS subscriber corresponding to the UE 200.

S408: The HSS replies with a Multimedia Authentication Answer with the authentication vector for the subscriber including a random value RAND, a network authentication token AUTN, an expected response XRES and the Internet protocol security (IPsec) confidentiality key Ck and integrity key Ik.

S409: The S-CSCF stores the XRES values and replies to the SIP REGISTER request with a SIP 401 Unauthorized response indicating that the subscriber has not been authenticated and includes the parameters RAND, AUTN, Ck and Ik.

S410: The P-CSCF receives the SIP 401 Unauthorized response from the S-CSCF, stores the values Ck and Ik and forwards to the UE 200 the SIP 401 Unauthorized response, including the RAND and AUTN values.

S411: The UE 200 receives the SIP 401 Unauthorized response with the RAND and AUTN values. Using the values received together with its secret key stored in the universal integrated circuit card (UICC) the UE 200 authenticates the network and calculates the response RES and Ck and Ik IPsec keys. Using the Ck and Ik keys the UE 200 establishes an IPsec connection to the P-CSCF to protect the signaling channel.

S412: The UE 200 sends a new SIP REGISTER message to the IMS including the response RES. The UE 200 includes the call status information as a VPCS indication. The P-CSCF forwards the request to the I-CSCF.

One way to partly implement step S412 is to perform step S102 and step S202.

S413: The I-CSCF sends a Diameter User Authorization Requests to the HSS to retrieve the identity of the S-CSCF where the SIP REGISTER shall be forwarded.

S414: The HSS replies with a User Authorization Answer with the S-CSCF previously selected.

S415: The I-CSCF forwards the SIP REGISTER message to the S-CSCF.

S416: The S-CSCF receives the SIP REGISTER message and checks if the RES received from the UE 200 matches the XRES stored. If the values match the subscriber is authenticated and successfully registered in the IMS. The S-CSCF indicates with a Server Assignment Request to the HSS that the subscriber has been registered with the S-CSCF.

S417: The HSS replies with a Server Assignment Answer message which includes the associated public identities for the subscriber and the service profile.

S418: The S-CSCF replies with a SIP 200 OK message indicating that the registration was successful. The message is forwarded to the UE 200.

S419: The IMS performs third party registration for the UE 200. During the third party registration the call status information is as a VPCS indication carried from the S-CSCF to the AS 400.

One way to partly implement step S419 is to perform step S204 and step S302.

S420: (Optional) The IMS (P-CSCF) subscribes to events or status reports from the EPC.

S421: The UE 200 is ready to subscribe to registration events.

Figure 6:
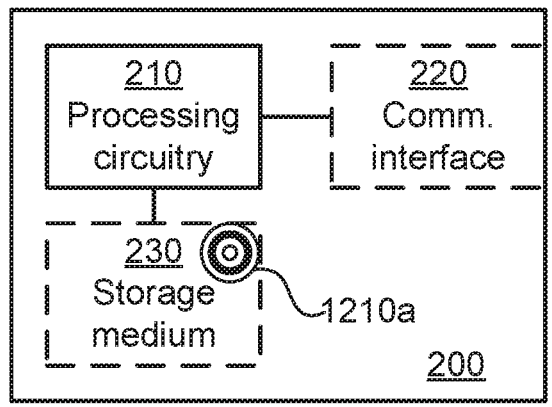
FIG. 6 is a schematic diagram showing functional units of a UE according to an embodiment.

FIG. 6 schematically illustrates, in terms of a number of functional units, the components of a UE 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the UE 200 to perform a set of operations, or steps, as disclosed above. For example, the storage medium 230 may store the set of operations, and the processing circuitry 210 may be configured to retrieve the set of operations from the storage medium 230 to cause the UE 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The UE 200 may further comprise a communications interface 220 for communications with other functions, nodes, entities, and devices, as well as for user interaction.

As such the communications interface 220 may comprise one or more transmitters and receivers, comprising analogue and digital components.

The processing circuitry 210 controls the general operation of the UE 200 e.g. by sending data and control signals to the communications interface 220 and the storage medium 230, by receiving data and reports from the communications interface 220, and by retrieving data and instructions from the storage medium 230. Other components, as well as the related functionality, of the UE 200 are omitted in order not to obscure the concepts presented herein.

Figure 7:
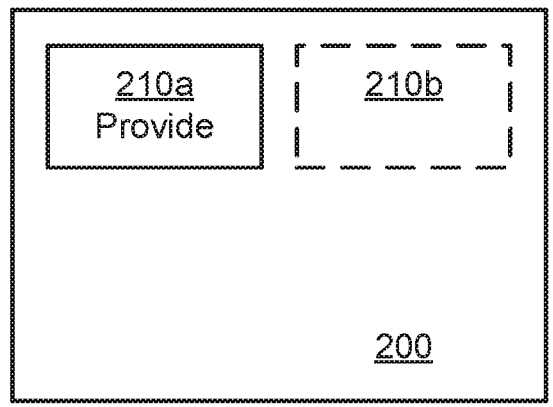
FIG. 7 is a schematic diagram showing functional modules of a UE according to an embodiment.

FIG. 7 schematically illustrates, in terms of a number of functional modules, the components of a UE 200 according to an embodiment. The UE 200 of FIG. 7 comprises a provide module 210a configured to perform step S102. The UE 200 of FIG. 7 may further comprise a number of optional functional modules, as represented by functional module 210b. In general terms, each functional module 210a-210b may be implemented in hardware or in software. Preferably, one or more or all functional modules 210a-210b may be implemented by the processing circuitry 210, possibly in cooperation with the communications interface 220 and the storage medium 230. The processing circuitry 210 may thus be arranged to from the storage medium 230 fetch instructions as provided by a functional module 210a-210b and to execute these instructions, thereby performing any steps of the UE 200 as disclosed herein.

Figure 8:
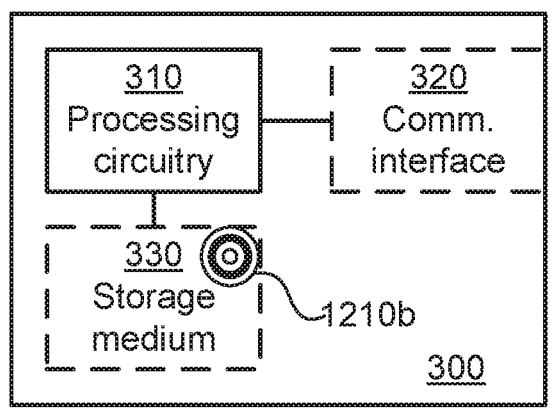
FIG. 8 is a schematic diagram showing functional units of a CSCF according to an embodiment.

FIG. 8 schematically illustrates, in terms of a number of functional units, the components of a CSCF 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the CSCF 300 to perform a set of operations, or steps, as disclosed above. For example, the storage medium 330 may store the set of operations, and the processing circuitry 310 may be configured to retrieve the set of operations from the storage medium 330 to cause the CSCF 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The CSCF 300 may further comprise a communications interface 320 for communications with functions, nodes, entities, and devices. As such the communications interface 320 may comprise one or more transmitters and receivers, comprising analogue and digital components.

The processing circuitry 310 controls the general operation of the CSCF 300 e.g. by sending data and control signals to the communications interface 320 and the storage medium 330, by receiving data and reports from the communications interface 320, and by retrieving data and instructions from the storage medium 330. Other components, as well as the related functionality, of the CSCF 300 are omitted in order not to obscure the concepts presented herein.

Figure 9:
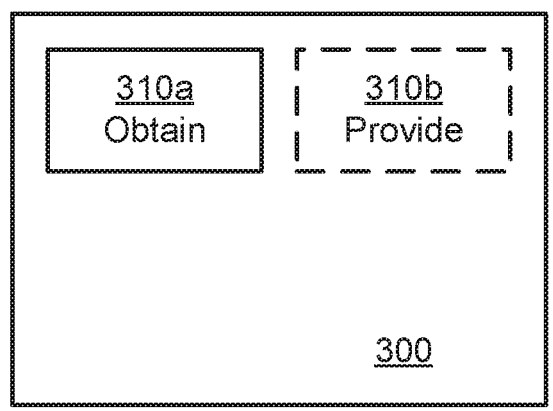
FIG. 9 is a schematic diagram showing functional modules of a CSCF according to an embodiment.

FIG. 9 schematically illustrates, in terms of a number of functional modules, the components of a CSCF 300 according to an embodiment. The CSCF 300 of FIG. 9 comprises an obtain module 310a configured to perform step S202. The CSCF 300 of FIG. 9 may further comprise a number of optional functional modules, such as a provide module 310b configured to perform step S204. In general terms, each functional module 310a-310b may be implemented in hardware or in software. Preferably, one or more or all functional modules 310a-310b may be implemented by the processing circuitry 310, possibly in cooperation with the communications interface 320 and the storage medium 330. The processing circuitry 310 may thus be arranged to from the storage medium 330 fetch instructions as provided by a functional modules 310a-310b and to execute these instructions, thereby performing any steps of the CSCF 300 as disclosed herein.

Figure 10:
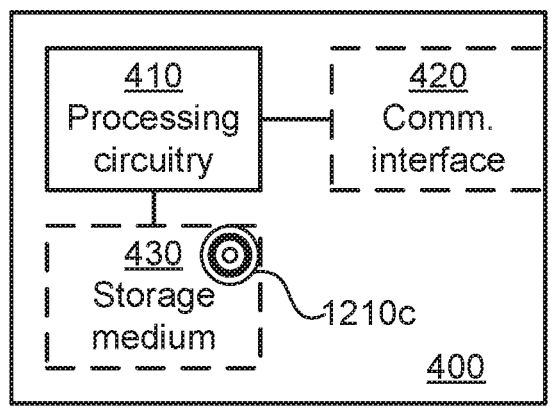
FIG. 10 is a schematic diagram showing functional units of an AP according to an embodiment.

FIG. 10 schematically illustrates, in terms of a number of functional units, the components of an AS 400 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1110c (as in FIG. 12), e.g. in the form of a storage medium 430. The processing circuitry 410 may further be provided as at least one application specific integrated circuit (ASIC), or field programmable gate array (FPGA).

Particularly, the processing circuitry 410 is configured to cause the AS 400 to perform a set of operations, or steps, as disclosed above. For example, the storage medium 430 may store the set of operations, and the processing circuitry 410 may be configured to retrieve the set of operations from the storage medium 430 to cause the AS 400 to perform the set of operations. The set of operations may be provided as a set of executable instructions. Thus the processing circuitry 410 is thereby arranged to execute methods as herein disclosed.

The storage medium 330 may also comprise persistent storage, which, for example, can be any single one or combination of magnetic memory, optical memory, solid state memory or even remotely mounted memory.

The AS 400 may further comprise a communications interface 420 for communications with functions, nodes, entities, and devices. As such the communications interface 420 may comprise one or more transmitters and receivers, comprising analogue and digital components.

The processing circuitry 410 controls the general operation of the AS 400 e.g. by sending data and control signals to the communications interface 420 and the storage medium 430, by receiving data and reports from the communications interface 420, and by retrieving data and instructions from the storage medium 4300. Other components, as well as the related functionality, of the AS 400 are omitted in order not to obscure the concepts presented herein.

Figure 11:
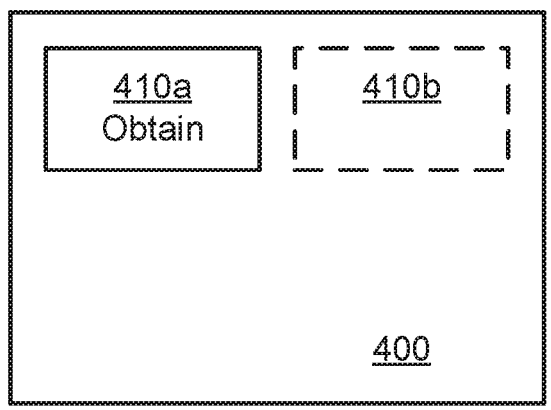
FIG. 11 is a schematic diagram showing functional modules of an AP according to an embodiment.

FIG. 11 schematically illustrates, in terms of a number of functional modules, the components of an AS 400 according to an embodiment. The AS 400 of FIG. 11 comprises an obtain module 410a configured to perform step S302. The AS 400 of FIG. 11 may further comprise a number of optional functional modules, such as represented by functional module 410b. In general terms, each functional module 410a-410b may be implemented in hardware or in software. Preferably, one or more or all functional modules 410a-410b may be implemented by the processing circuitry 410, possibly in cooperation with the communications interface 420 and the storage medium 430. The processing circuitry 410 may thus be arranged to from the storage medium 430 fetch instructions as provided by a functional module 410a-410b and to execute these instructions, thereby performing any steps of the AS 400 as disclosed herein.

The CSCF 300 and/or AS 400 may be provided as a standalone device or as a part of at least one further device. For example, according to the example of FIG. 1 the CSCF 300 and/or AS 400 may be provided in a node of the core network. Alternatively, functionality of the CSCF 300 and/or AS 400 may be distributed between at least two devices, or nodes.

Thus, a first portion of the instructions performed by the CSCF 300 and/or AS 400 may be executed in a first device, and a second portion of the of the instructions performed by the CSCF 300 and/or AS 400 may be executed in a second device; the herein disclosed embodiments are not limited to any particular number of devices on which the instructions performed by CSCF 300 and/or AS 400 may be executed. Hence, the methods according to the herein disclosed embodiments are suitable to be performed by a CSCF 300 and/or AS 400 residing in a cloud computational environment. Therefore, although a single processing circuitry 310, 410 is illustrated in FIGS. 8 and 10 the processing circuitry 310, 410 may be distributed among a plurality of devices, or nodes. The same applies to the functional modules 310a-310b, 410a-410b of FIGS. 9 and 11 and the computer programs 1120b, 1120c of FIG. 12.

Figure 12:
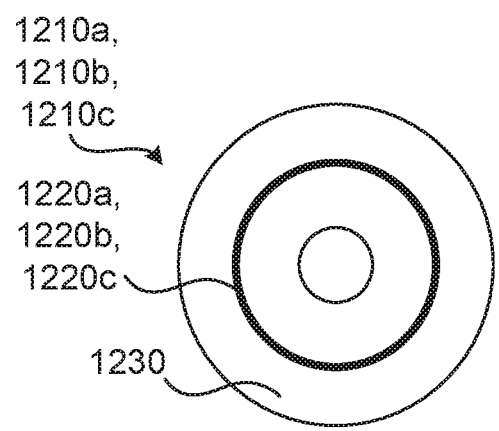
FIG. 12 shows one example of a computer program product comprising computer readable means according to an embodiment.

FIG. 12 shows one example of a computer program product 1110a, 1110b, 1110c comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the UE 200 as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the CSCF 300 as herein disclosed. On this computer readable means 1130, a computer program 1120c can be stored, which computer program 1120c can cause the processing circuitry 410 and thereto operatively coupled entities and devices, such as the communications interface 420 and the storage medium 430, to execute methods according to embodiments described herein. The computer program 1120c and/or computer program product 1110c may thus provide means for performing any steps of the AS 400 as herein disclosed.

In the example of FIG. 12, the computer program product 1110a, 1110b, 1110c is illustrated as an optical disc, such as a CD (compact disc) or a DVD (digital versatile disc) or a Blu-Ray disc. The computer program product 1110a, 1110b, 1110c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b, 1120c is here schematically shown as a track on the depicted optical disk, the computer program 11208a, 1120b, 1120c can be stored in any way which is suitable for the computer program product 1110a, 1110b, 1110c.

Figure 13:
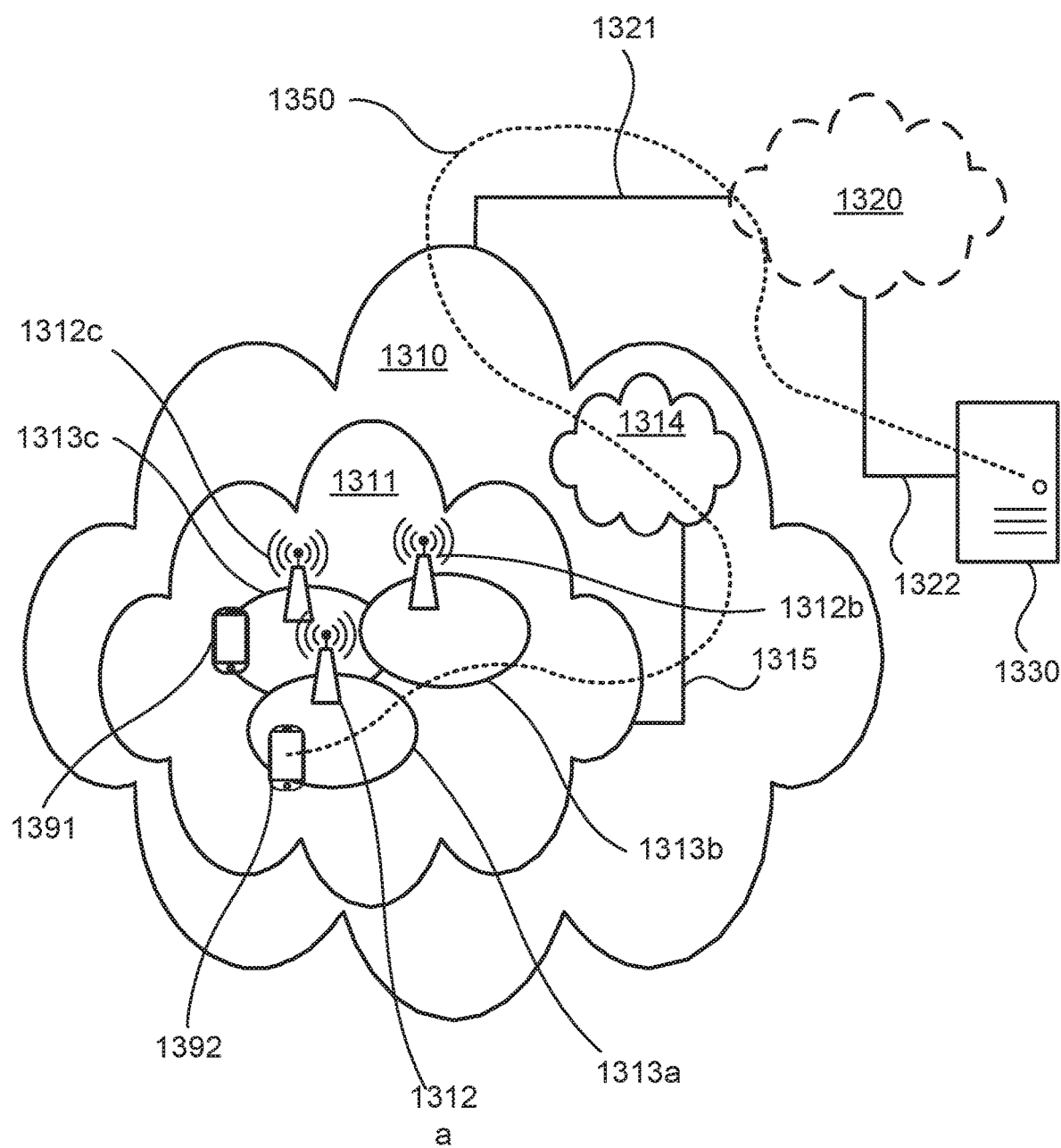
FIG. 13 is a schematic diagram illustrating a telecommunication network connected via an intermediate network to a host computer in accordance with some embodiments.

FIG. 13 is a schematic diagram illustrating a telecommunication network connected via an intermediate network to a host computer in accordance with some embodiments. In accordance with an embodiment, a communication system includes telecommunication network 1310, such as a 3GPP-type cellular network, which comprises access network 1311, such as radio access network 110 in FIG. 1, and core network 1314, such as core network 120 in FIG. 1. Access network 1311 comprises a plurality of network nodes 1312a, 1312b, 1312c, such as NBs, eNBs, gNBs (each corresponding to the network node 140 of FIG. 2) or other types of wireless access points, each defining a corresponding coverage area, or cell, 1313a, 1313b, 1313c. Each network node 1312a, 1312b, 1312c is connectable to core network 1314 over a wired or wireless connection 1315. A first UE 1391 located in coverage area 1313c is configured to wirelessly connect to, or be paged by, the corresponding network node 1312c. A second UE 1392 in coverage area 1313a is wirelessly connectable to the corresponding network node 1312a. While a plurality of UEs 1391, 1392 are illustrated in this example, the disclosed embodiments are equally applicable to a situation where a sole UE is in the coverage area or where a sole UE is connecting to the corresponding network node 1312. The UEs 1391, 1392 correspond to the UE 200 of FIG. 1.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 420. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OT) connection 450.

Host computer 1330 and the connected UEs 1391, 1392 are configured to communicate data and/or signaling via OTT connection 450, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, network node 1312 may not or need not be informed about the past routing of an incoming downlink communication with data originating from host computer 1330 to be forwarded (e.g., handed over) to a connected UE 1391. Similarly, network node 1312 need not be aware of the future routing of an outgoing uplink communication originating from the UE 1391 towards the host computer 1330.

Figure 14:
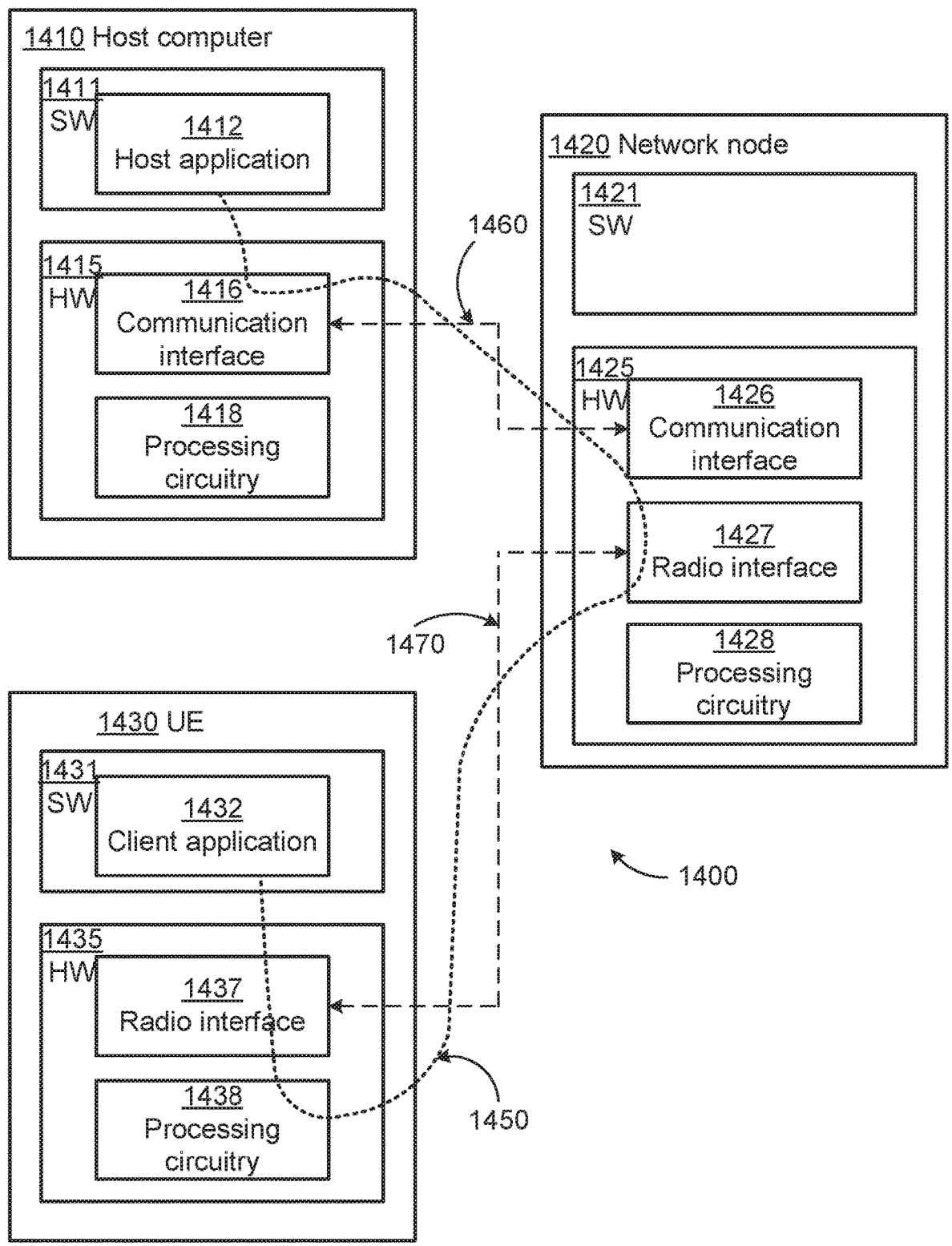
FIG. 14 is a schematic diagram illustrating host computer communicating via a network node with a terminal device over a partially wireless connection in accordance with some embodiments.

FIG. 14 is a schematic diagram illustrating a communication system 1400 for a host computer communicating via a network node with a UE over a partially wireless connection in accordance with some embodiments. Example implementations, in accordance with an embodiment, of the UE, network node and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. The UE 1430 corresponds to the UE 200 of FIGS. 1, 6, 7. In providing the service to the remote user, host application 1412 may provide user data which is transmitted using OTT connection 1450.

Communication system 1400 further includes network node 1420 provided in a telecommunication system and comprising hardware 1425 enabling it to communicate with host computer 1410 and with UE 1430. The network node 1420 corresponds to the network nodes 140 of FIG. 1. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by network node 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of network node 1420 further includes processing circuitry 1428, which may comprise one or more programmable processors, application-specific integrated circuits, field programmable gate arrays or combinations of these (not shown) adapted to execute instructions. Network node 1420 further has software 1421 stored internally or accessible via an external connection.

Communication system 1400 further includes terminal device 1430 already referred to. Its hardware 1435 may include radio interface 1437 configured to set up and maintain wireless connection 1470 with a network node serving a coverage area in which terminal device 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. Terminal device 1430 further comprises software 1431, which is stored in or accessible by UE 1430 and executable by processing circuitry 1438. Software 1431 includes client application 1432. Client application 1432 may be operable to provide a service to a human or non-human user via terminal device 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, network node 1420 and UE 1430 illustrated in FIG. 14 may be similar or identical to host computer 1330, one of network nodes 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via network node 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and network node 1420 is in accordance with the teachings of the embodiments described throughout this disclosure. One or more of the various embodiments improve the performance of OTT services provided to terminal device 1430 using OTT connection 1450, in which wireless connection 1470 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect network node 1420, and it may be unknown or imperceptible to network node 1420. Such procedures and functionalities may be known and practiced in the art. In certain embodiments, measurements may involve proprietary UE signaling facilitating host computer's 1410 measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for indicating evolved packet system (EPS) fallback capability, the method being performed by a user equipment (UE) the method comprising:
   providing, towards a call session control function (CSCF), call status information with respect to EPS fallback capability of the UE, wherein the call status information is provided in a session initiation protocol (SIP) Register message.

2. The method of claim 1, wherein the call status information is provided towards the CSCF during registration of the UE with the CSCF.

3. The method of claim 1, wherein the call status information is provided as part of call set-up signaling for the UE.

4. The method of claim 3, wherein the call status information specifies that the call will be subject to EPS fallback.

5. The method of claim 4, wherein the call status information specifies that the call will be subject to EPS fallback only when the UE supports EPS fallback but not native Internet Protocol Multimedia Subsystem (IMS) voice service on a Next Generation Radio Access Network (NG-RAN/NR).

6. The method of claim 3, wherein the call status information specifies that the UE supports EPS fallback.

7. The method of claim 6, wherein the call status information specifies that the UE supports both EPS fallback and native Internet Protocol Multimedia Subsystem (IMS) voice service on a Next Generation Radio Access Network (NG-RAN/NR).

8. The method of claim 3, wherein the call status information specifies that the call will not be subject to EPS fallback.

9. The method of claim 8, wherein the call status information specifies that the call will not be subject to EPS fallback only when the UE does not support EPS fallback but only native Internet Protocol Multimedia Subsystem (IMS) voice service on a Next Generation Radio Access Network (NG-RAN/NR).

10. The method of claim 3, wherein the call status information specifies whether or not the UE supports any of: Internet Protocol Multimedia Subsystem (IMS) voice service on a Long Term Evolution (LTE) connected to Evolved Packet Core (EPC), or IMS voice on EPC-integrated WiFi.

11. The method of claim 1, wherein the call status information is provided as a voice packet core support indication (VPCS).

12. A method for obtaining indication of evolved packet system (EPS) fallback capability, the method being performed by a call session control function (CSCF) the method comprising:
    obtaining call status information with respect to EPS fallback capability of a user equipment (UE), the call status information originating from the UE; and
    providing the call status information towards an application server (AS).

13. The method of claim 12, wherein the call status information is obtained during registration of the UE with the CSCF.

14. The method of claim 12, wherein the call status information is obtained as part of call set-up signaling for the UE.

15. A method for obtaining indication of evolved packet system (EPS) fallback capability, the method being performed by an application server (AS) and comprising:
    obtaining, from a call session control function (CSCF), call status information with respect to EPS fallback capability of a user equipment (UE), the call status information originating from the UE.

16. The method of claim 15, wherein the call status information is obtained as part of call set-up signaling for the UE.

17. A user equipment (UE) for indicating evolved packet system (EPS) fallback capability, the UE comprising processing circuitry, the processing circuitry being configured to cause the UE to:
    provide, towards a call session control function (CSCF), call status information with respect to EPS fallback capability of the UE, wherein the call status information is provided in a session initiation protocol (SIP) Register message.

18. A call session control function (CSCF) for obtaining indication of evolved packet system (EPS) fallback capability, the CSCF comprising processing circuitry, the processing circuitry being configured to cause the CSCF to:
    obtain call status information with respect to EPS fallback capability of a user equipment (UE), the call status information originating from the UE; and
    providing the call status information towards an application server (AS).

19. An application server (AS) for obtaining indication of evolved packet system (EPS) fallback capability, the AS comprising processing circuitry, the processing circuitry being configured to cause the AS to:
    obtain, from a call session control function (CSCF), call status information with respect to EPS fallback capability of a user equipment (UE), the call status information originating from the UE.

* * * * *